(12) United States Patent  (10) Patent No.: US 11,202,496 B2
Beaton  (45) Date of Patent: Dec. 21, 2021

(54) DETACHABLE CARRIER FOR BEACH BADGES/POOL TAGS

(71) Applicant: Robert John Beaton, Ocean Gate, NJ (US)

(72) Inventor: Robert John Beaton, Ocean Gate, NJ (US)

( * ) Notice: Subject to any disclaimer, the term of this patent is extended or adjusted under 35 U.S.C. 154(b) by 0 days.

(21) Appl. No.: 15/202,632

(22) Filed: Jul. 6, 2016

(65) Prior Publication Data

US 2018/0279748 A1  Oct. 4, 2018

Related U.S. Application Data

(60) Provisional application No. 62/197,568, filed on Jul. 28, 2015.

(51) Int. Cl.
| | |
|---|---|
| *A45F 5/02* | (2006.01) |
| *F16B 45/02* | (2006.01) |
| *A45C 13/42* | (2006.01) |
| *G09F 3/20* | (2006.01) |
| G09F 3/14 | (2006.01) |
| A45F 5/00 | (2006.01) |

(52) U.S. Cl.
CPC ............. *A45F 5/02* (2013.01); *A45C 13/42* (2013.01); *A45F 5/021* (2013.01); *F16B 45/02* (2013.01); *G09F 3/207* (2013.01); *A45F 2005/006* (2013.01); *A45F 2005/026* (2013.01); *A45F 2200/05* (2013.01); *G09F 3/14* (2013.01)

(58) Field of Classification Search
CPC .... A45F 5/00; A45F 5/02; A45F 5/021; A45F 2200/0516; A45F 2005/006
See application file for complete search history.

(56) References Cited

U.S. PATENT DOCUMENTS

| | | | | |
|---|---|---|---|---|
| 9,955,761 | B2 * | 5/2018 | Maddox | ................. A45C 11/00 |
| 2003/0102342 | A1 * | 6/2003 | Fogg | ......................... A45F 5/02 |
| | | | | 224/269 |
| 2010/0147912 | A1 * | 6/2010 | Salentine | ................. A45F 5/02 |
| | | | | 224/254 |

* cited by examiner

*Primary Examiner* — Corey N Skurdal
(74) *Attorney, Agent, or Firm* — Coffy Law, LLC; Emmanuel Coffy, Esq.

(57) ABSTRACT

A composite structure and article of manufacture for a detachable carrier for beach badge or pool tag are disclosed. In various embodiments, a composite structure having a clip, a strap and a body arranged as a carrier for a metal pin badge that can be easily attached and detached in its entirety is disclosed. The composite structure further comprises front and back sides and an inner layer. At the top of the composite structure, the strap forms a larger loop that is used to attach the composite structure to a clip or device. At the far end of the composite structure, the beach badge is mounted onto the composite structure by inserting the metal pin of the badge through one of the insertion point created by one or more delimiters.

11 Claims, 5 Drawing Sheets

(FRONT VIEW)

(FRONT VIEW)

(FRONT VIEW)
W/O DEVICE 105

(BACK VIEW)

(BACK VIEW)
W/O DEVICE 105

(SIDE VIEW)

DETACHABLE CARRIER FOR BEACH BADGES/POOL TAGS

CROSS REFERENCE TO RELATED APPLICATIONS

This application claims the benefit to U.S. Provisional Application No. 62/197,568, filed on Jul. 28, 2015, which application is incorporated herein by reference as if set forth in its entirety.

FIELD OF THE INVENTION

The invention relates generally to beach badges/pool tags and, more specifically, to a carrier for a metal pin badge.

BACKGROUND

Beach badges (also known as beach tags, beach tokens, or pool tags) are small admission passes that are used to access a beach, pool, or other recreational area. The beach badge is typically made of a small placard and a sharp crimp pin with a clasp. Traditionally, an individual displays the beach badge by affixing it to oneself, usually by poking the pin through their clothing, and securing the clasp.

Several problems arise from the use of beach badges. These problems include, but are not limited to, the following: (1) Beach badges cause permanent damage and/or ruin articles of clothing because the crimp pin pokes holes through one's clothing; (2) The crimp pin is cumbersome to use, making beach badges difficult to individually attach and detach; and (3) Beach badges can be lost if not properly organized, or if the crimp pin is improperly clasped, which can be a common occurrence when beach badges are frequently used (attached and detached).

SUMMARY

Various deficiencies of the prior art are addressed by a carrier for a metal pin badge. One embodiment comprises a composite structure having front and back sides and an inner layer arranged as a carrier for a metal pin badge, which includes a device attached at the distal end of the composite structure; a strap having a primary surface area, one or more sections with a first section forming a loop housing the device; and a body having a primary surface providing a longitudinal area to lay the strap, said body making-up the inner layer of the composite structure; wherein the metal pin badge is mounted on a second section of the strap.

Another embodiment comprises an article of manufacture, which includes a composite structure having front and back sides and an inner layer arranged as a carrier for a metal pin badge, wherein the composite structure includes a device attached at the distal end of the composite structure, a strap having a primary surface, one or more sections with a first section forming a loop housing the device; and a body having a primary surface to thereby place the strap said body making-up the inner layer of the composite structure; wherein the strap is further affixed to the body at several points forming the one or more sections and making peripheral lips on side edges of the composite structure.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the Figures.

DETAILED DESCRIPTION

The invention will be primarily described within the context of particular embodiments; however, those skilled in the art and informed by the teachings herein will realize that the invention is also applicable to other technical areas and/or embodiments.

The illustrative composite structure means for and article of manufacture embodiments described herein are not meant to be limiting. It may be readily understood that certain aspects of the disclosed composite structure, means for and article of manufacture can be arranged and combined in a variety of different configurations, all of which are contemplated herein.

Generally speaking, the various embodiments solve the inherent problems with beach badges disclosing a carrier for beach badges that can be easily attached and detached in its entirety. The advantages include: (1) the user need not poke holes in his/her clothing with the beach badge pin; (2) the user can quickly and easily attach/detach his/her beach badge; and (3) the user is less likely to lose or misplace their beach badges.

Various embodiments operate to provide a composite structure having front and back sides and an inner layer arranged as a carrier for a metal pin badge, comprising a clip, the strap and the body. In one embodiment, composite structure 100 is five (5) inches in length and one (1) inch in width. In other embodiments, different models are different lengths and widths.

Figure 1:
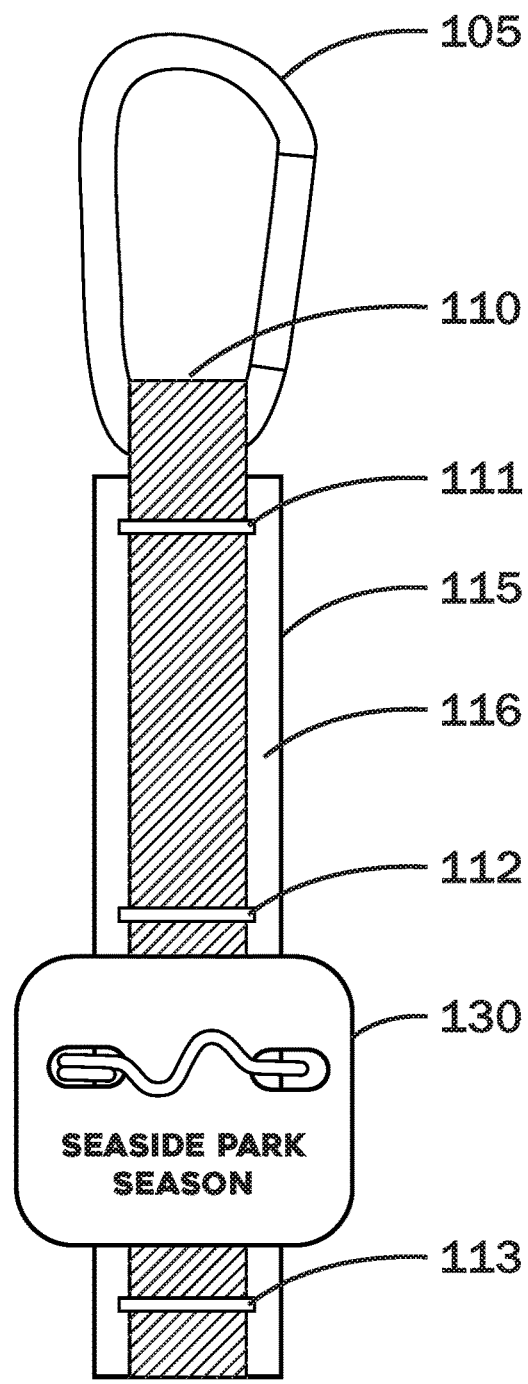
FIG. 1 depicts a front perspective view of a detachable carrier device according to an embodiment.

FIG. 1 depicts a front perspective view of a detachable carrier device according to an embodiment. Specifically, FIG. 1 depicts a composite structure 100 that includes a clip or device 105, a strap 110, a body 115, a plurality of delimiters 111-113, a lip 116 and a badge 130. As shown, clip or device 105 is attached at the top or distal end of carrier 100. In one embodiment, clip or device 105 is a carabiner style metal clip. In other embodiment, clip or device 105 is made of different material. For example, synthetic plastic polymer such as PVC (polyvinyl chloride) type material can be used for clip or device 105. Clip 105 is used to attach composite structure 100 to the user's clothing via one or more sections or insertion points created by delimiters 111-113 as further described below. In some embodiments, composite structure 100 is attached to a personal item of the user, such as sandals, bicycles, shorts, bathing suit, back pack and the like.

Strap 110 is a material that wraps lengthwise around body 115. As a result, strap 110 is longer than body 115 and the length of strap 110 determines the length of composite structure 100. The primary surface of strap 110 makes up the front side of composite structure 100. In one embodiment, strap 110 is made of waterproof or impermeable material. The material can be plain in color and style. In other embodiments, the material is colorful and incorporates a design pattern. Strap 110 can also include perforations as part of the design. In some embodiments, the material is regular clothing material, such as fabric made of cotton, flax, wool, ramie, silk, denim, leather and the like. In yet other embodiments, strap 110 is made out of metal.

Body 115 is a material shorter and wider than strap 110. Body 115 provides a longitudinal area to lay the strap. Body 115 makes up the inner layer of composite structure 100. As a result, body 115 is wider than strap 110 and the width of body 115 determines the width of composite structure 100. In one embodiment, body 115 is made of waterproof or impermeable material similar to strap 110. The material can be plain in color and style. In other embodiments, the material is colorful. In some embodiments, the material is regular clothing material, such as fabric made of cotton, flax, wool, ramie, silk, denim, leather and the like. In yet other embodiments, body 115 is made out of metal.

The strap is affixed to the body at several points or delimiters 111-113 along its length. The number of delimiters is only limited by the dimension of the carrier. These delimiters can be sewn or sealed onto the body depending on the manufacturing technology used to prepare carrier 100. The delimiters are spaced apart thereby forming insertion points to mount beach badge 130. As shown, beach badge 130 is inscribed with the text: "Seaside Park Season." This is for illustrative purposes and may be replaced with a more appropriate text indicative of the actual location and any other text that is deemed necessary and/or fitting.

Figure 2:
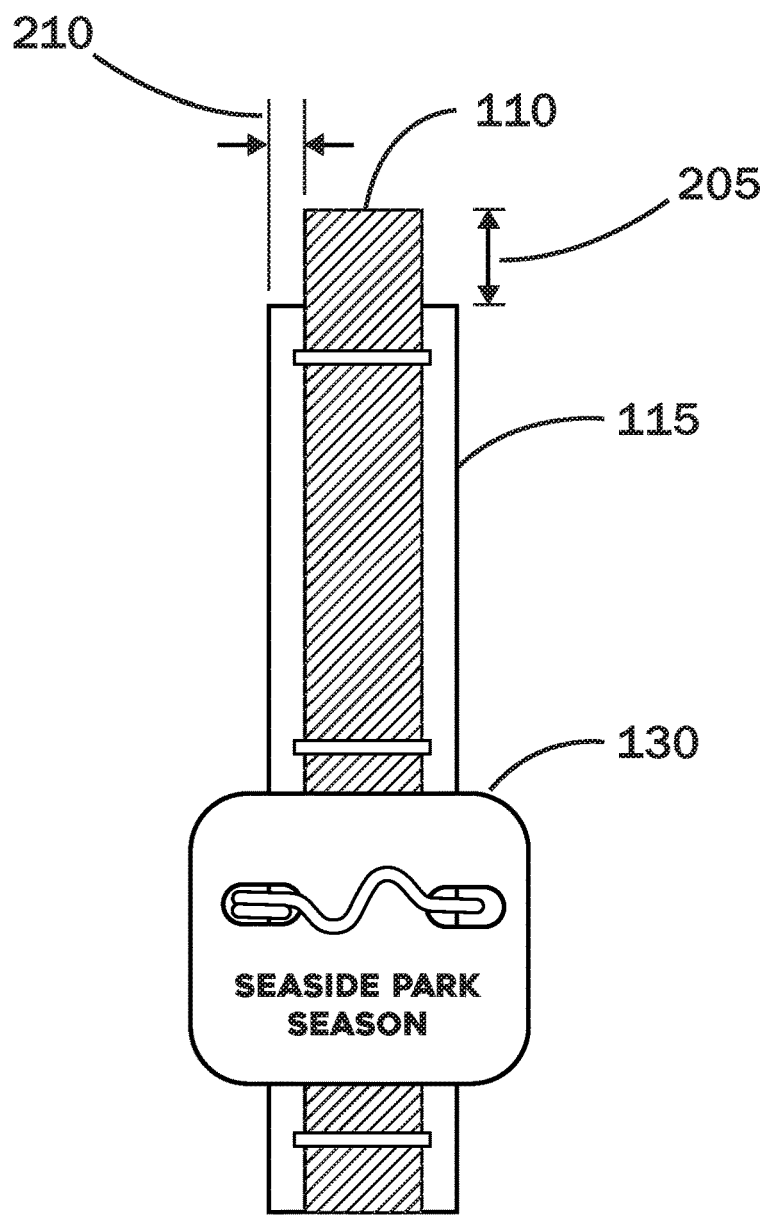
FIG. 2 depicts a front perspective view without the carrier device according to an embodiment.

FIG. 2 depicts a front perspective view without the carrier device according to an embodiment. At the top of composite structure 100, strap 110 forms a larger loop or first section of length 205 that is used to attach composite structure 100 to clip or device 105. As articulated above, body 115, which makes-up the inner layer of composite structure 100 is wider than strap 110 thereby producing lip 116. There is a right peripheral lip 116 and a left peripheral lip 210.

Figure 3:
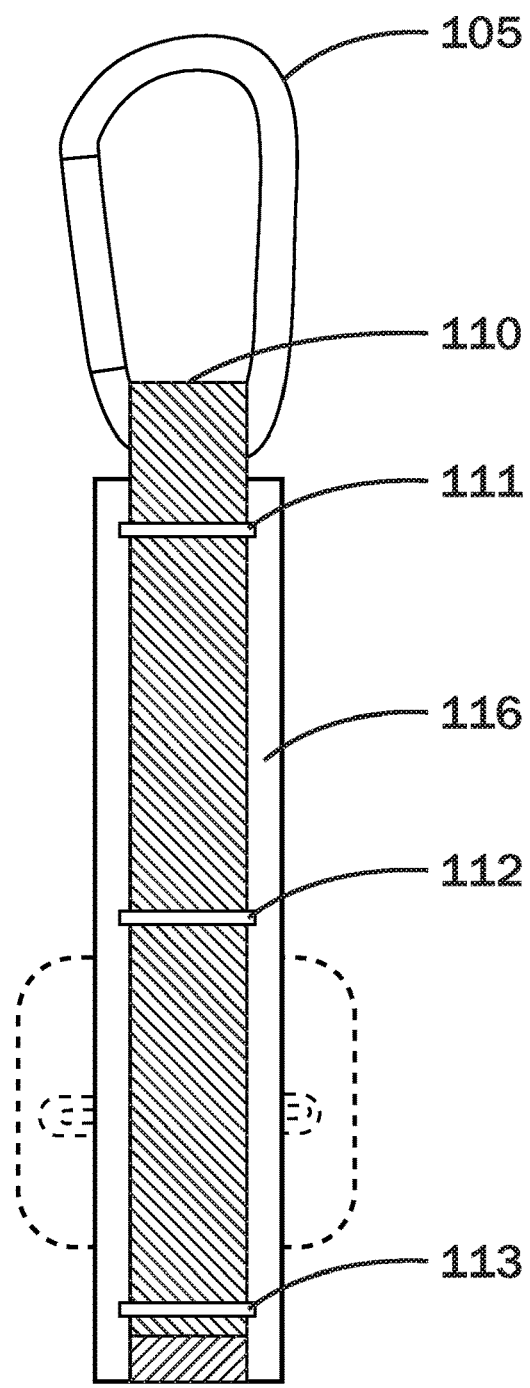
FIG. 3 depicts a back view of a detachable carrier device according to an embodiment.

FIG. 3 depicts a back view of a detachable carrier device according to an embodiment. Beach badge 130 is shown mounted onto composite structure 100 with the metal pin inserted through one of the insertion point created by delimiters 111-113. The secondary surface of strap 110 makes up the back side of composite structure 100. The back side of composite structure 100 need not be the same as the front side. In some embodiments, the back side of composite structure 100 is different in color and design as the front side. In other embodiments, body 115 primary surface serves as the inner layer for composite structure 100 whereas strap 110 primary surface serves as the front side of composite structure 100. In this case, body 115 secondary surface serves as the back side of composite structure 100.

Figure 4:
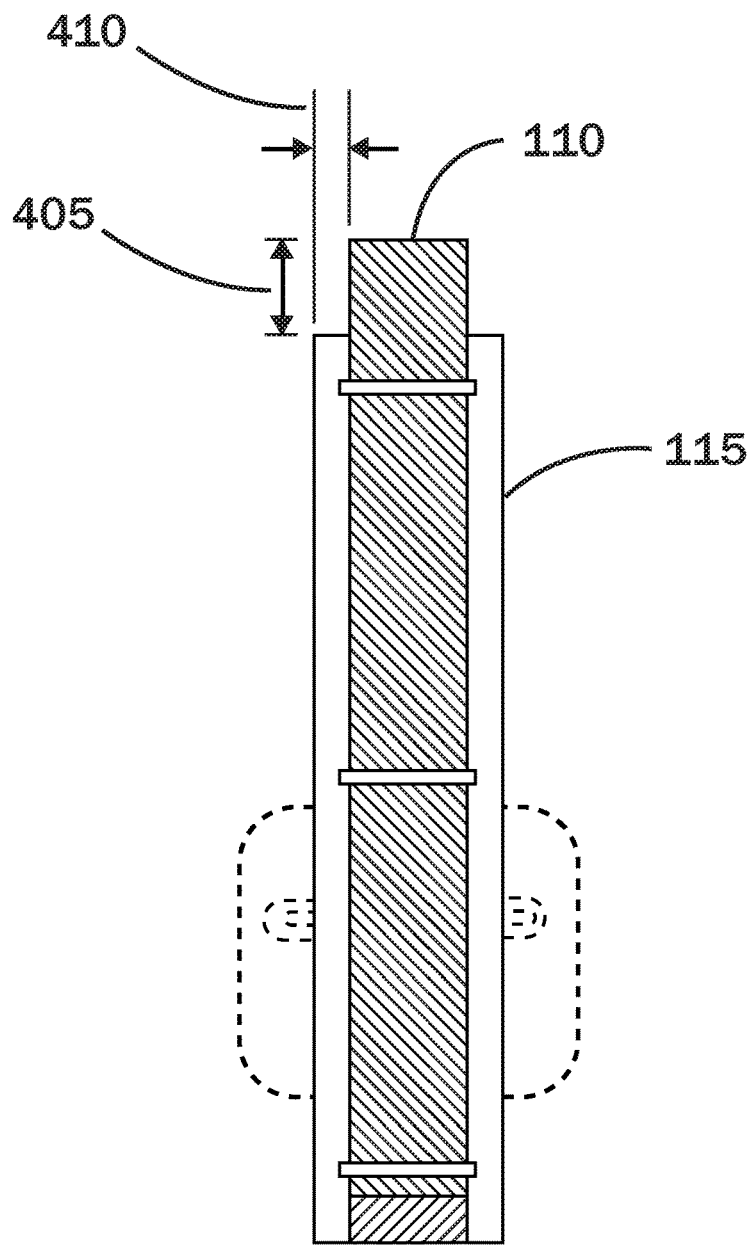
FIG. 4 depicts a back view without the carrier device according to an embodiment.

FIG. 4 depicts a back view without the carrier device according to an embodiment. At the top of composite structure 100, strap 110 forms a larger loop 405 that is used to attach composite structure 100 to clip or device 105. Peripheral lip 410 is actually peripheral lip 116 shown from the rear. The peripheral lips have dimensions and characteristics proportional to the dimensions of the strap and body of composite structure 100.

Figure 5:
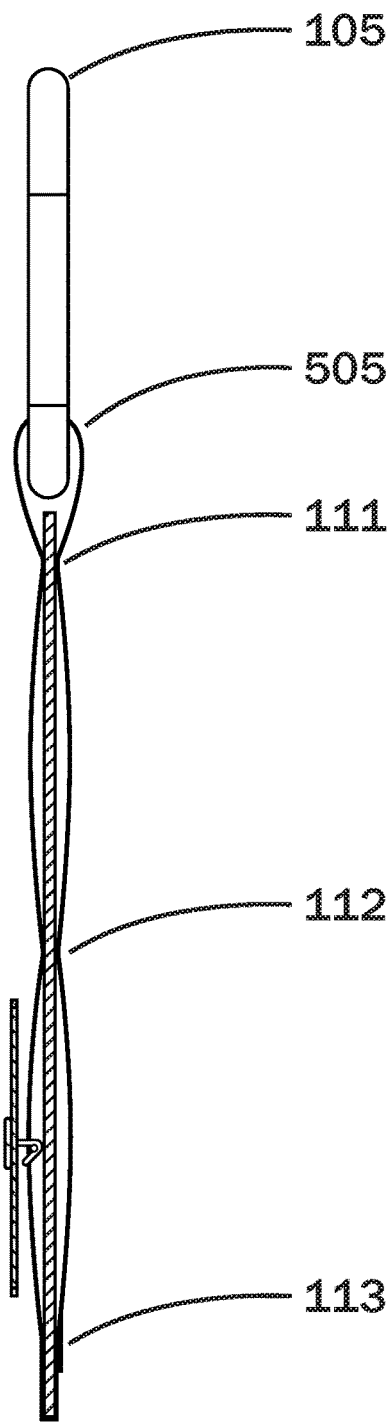
FIG. 5 depicts a perspective side view of a detachable carrier device according to an embodiment.

FIG. 5 depicts a perspective side view of a detachable carrier device according to an embodiment. At the top of composite structure 100, strap 110 forms a larger loop 505 that is used to attach composite structure 100 to clip or device 105. As shown, the loop is wide enough to allow clip or device 105 to attach to composite structure or carrier 100. At the end of composite structure 100, beach badge 130 is shown mounted onto composite structure or carrier 100. This view clearly shows the pin inserted via an insertion point created by delimiter 112 and 113.

Although various embodiments, which incorporate the teachings of the present invention have been shown and described in detail herein, those skilled in the art can readily devise many other varied embodiments that still incorporate these teachings. For example, a combination of stamping process and high-speed manufacturing can be used to produce composite structure 100.

It is contemplated that some of the steps discussed herein as manufacturing methods may be implemented manually.

I claim:

1. A composite structure having front, back sides and an inner layer arranged as a carrier for a metal pin badge, comprising:
    a device attached. at a distal end of the composite structures;
    a strap having a primary surface area, one or more sections with a first section forming a loop housing the device; and
    a body having a primary surface providing a longitudinal area to lay the strap, said body making-up the inner layer of the composite structure;
    wherein the metal pin badge is mounted on a second section of the strap, said metal pin badge having an opening that accommodates straps whose width measures up to 7/8".

2. The composite structure of claim 1, wherein the device is a clip.

3. The composite structure of claim 2, wherein the clip a carahiner style metal clip.

4. The composite structure of claim 2, wherein the clip is attached to a personal item.

5. The composite structure of claim 4, wherein the personal item is a user's clothing, a bag, a chair, a belt, a bikini, bathing apparel, bicycles, flip flops, key hooks.

6. The composite structure of claim 5, wherein the strap is affixed to the body at several points forming the one or more sections and making peripheral lips on side edges of the composite structure.

7. The composite structure of claim 1, wherein the strap wraps lengthwise around the body thereby forming the loop housing the device.

8. The composite structure of claim 1, wherein the primary surface area of the strap becomes the front side and a secondary surface of the body becomes the back side of the composite structure.

9. A method for mounting the metal pin badge of claim 1, comprising the steps of:
    (a) unfastening a clasp of the metal pin;
    (b) passing a sharpened end of the metal pin laterally behind the strap loop without piercing the device itself; and
    (c) locking the clasp of the pin;
    Wherein the metal pin badge is properly mounted to the device, when the strap is captured within the clasped pin without the need to puncture the device's material with the pin.

10. A composite structure having front and back sides arranged as a carrier for a metal pin badge, comprising:
    means for attaching a device at a distal end of the composite structure;
    means for providing one or more sections with a first section forming a loop housing the device;
    means for providng an inner layer as support section for wrapping a material affixed to said support section at several points; and means for mounting the metal pin badge;
wherein the metal pin badge is mounted on a second section of the strap, said metal pin badge having an opening that accommodates straps whose width measures up to 7/8".

11. An article of manufacture, comprising:

a composite structure having front and back sides arranged as a carrier for a metal pin badge, wherein the composite structure includes a device attached at a distal end of the composite structure, a strap having a primary surface, one or more sections with a first section forming a loop housing the device; and a body as an inner layer having a primary surface to thereby place the strap;

said metal pin badge is mounted. on a second section. of the strap, said metal pin. badge having an opening that accommodates straps whose width measures up to 7/8";

wherein the strap is further affixed to the body at several points forming the one or more sections and making peripheral lips on side edges of the composite structure, said composite structure being configured for use in environment having resources associated with water.

\* \* \* \* \*